(12) United States Patent
Stuart et al.

(10) Patent No.: US 12,102,029 B2
(45) Date of Patent: Oct. 1, 2024

(54) ADJUSTABLE WEDGE ASSEMBLY FOR CHANGING ANGLE ON DISK DRILL CLOSING WHEEL

(71) Applicant: CNH Industrial Canada, Ltd., Saskatoon (CA)

(72) Inventors: Graham Douglas Stuart, Warman (CA); Timothy David Quinney, Saskatoon (CA); Jesse Blair Pidwerbesky, Warman (CA)

(73) Assignee: CNH Industrial Canada, Ltd. (CA)

( * ) Notice: Subject to any disclaimer, the term of this patent is extended or adjusted under 35 U.S.C. 154(b) by 744 days.

(21) Appl. No.: 17/357,571

(22) Filed: Jun. 24, 2021

(65) Prior Publication Data

US 2022/0408634 A1 Dec. 29, 2022

(51) Int. Cl.
*A01C 5/06* (2006.01)

(52) U.S. Cl.
CPC ................................ *A01C 5/068* (2013.01)

(58) Field of Classification Search
CPC .............................. A01C 5/066; A01C 5/068
See application file for complete search history.

(56) References Cited

U.S. PATENT DOCUMENTS

| 5,676,073 | A | 10/1997 | Bergland et al. |
| 6,918,343 | B2 | 7/2005 | Kester |
| 7,975,629 | B1 | 7/2011 | Martin |
| 8,863,857 | B2 | 10/2014 | Bassett |
| 9,402,340 | B2 | 8/2016 | Patwardhan et al. |
| 9,609,802 | B2 | 4/2017 | Needham et al. |
| 2005/0072344 | A1 | 4/2005 | Kester |
| 2014/0034344 | A1 | 2/2014 | Bassett |
| 2018/0263174 | A1* | 9/2018 | Hodel et al. ........... A01C 5/066 |
| 2020/0107486 | A1 | 4/2020 | Martin et al. |
| 2020/0359559 | A1 | 11/2020 | Koch et al. |
| 2020/0396894 | A1 | 12/2020 | Radtke et al. |
| 2022/0000014 | A1* | 1/2022 | Kowalchuk et al. .. A01C 5/068 |

FOREIGN PATENT DOCUMENTS

WO 2020225623 A1 11/2020

OTHER PUBLICATIONS

U.S. Appl. No. 17/357,492, filed Jun. 24, 2021, Graham Douglas Stuart.
U.S. Appl. No. 17/357,607, filed Jun. 24, 2021, Graham Douglas Stuart.

* cited by examiner

*Primary Examiner* — Tara Mayo
(74) *Attorney, Agent, or Firm* — Rebecca Henkel; Rickard K. DeMille; Peter K. Zacharias

(57) ABSTRACT

A row unit closing wheel assembly includes a closing wheel, a closing wheel arm, and a closing wheel shaft having a first end and a second end. The closing wheel is coupled to the first end and the closing wheel arm is coupled to the second end via a pivot joint. The row unit closing wheel assembly also includes an adjustable wedge assembly including a wedge coupled to the pivot joint. The adjustable wedge assembly is configured to adjust an angle of the closing wheel shaft relative to the closing wheel arm along a horizontal plane via movement of the closing wheel shaft about the pivot joint. The horizontal plane is orthogonal to a rotational axis of the pivot joint.

20 Claims, 15 Drawing Sheets

ADJUSTABLE WEDGE ASSEMBLY FOR CHANGING ANGLE ON DISK DRILL CLOSING WHEEL

BACKGROUND

The present disclosure relates generally to agricultural implements.

Certain agricultural implements, such as disk drills, may be used to open trenches in a soil surface and to place agricultural product, such as seed or fertilizer, in the trenches. A disk drill may have several row units attached to a frame and arranged in a row. This arrangement may form several parallel rows of deposited agricultural product as the disk drill is pulled through a field by a tractor. Each row unit may include an opener disk that excavates a trench into the soil surface, a product chute configured to deposit the agricultural product into the trench, and a packing wheel (e.g., closing wheel) configured to pack the displaced soil on top of the agricultural product. Unfortunately, certain soil conditions (e.g., wetter soils, soils with high clay or silt content, soils with heavy field residue, etc.) keep the closing system from collapsing a sidewall of a seed trench, which negatively impacts seed germination, and ultimately yield.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a row unit closing wheel assembly includes a closing wheel, a closing wheel arm, and a closing wheel shaft having a first end and a second end. The closing wheel is coupled to the first end and the closing wheel arm is coupled to the second end via a pivot joint. The row unit closing wheel assembly also includes an adjustable wedge assembly including a wedge coupled to the pivot joint. The adjustable wedge assembly is configured to adjust an angle of the closing wheel shaft relative to the closing wheel arm along a horizontal plane via movement of the closing wheel shaft about the pivot joint. The horizontal plane is orthogonal to a rotational axis of the pivot joint.

In another embodiment, an agricultural implement includes at least one row unit closing wheel assembly. The at least one row unit closing wheel assembly includes a closing wheel, a closing wheel arm, and a closing wheel shaft having a first end and a second end. The closing wheel is coupled to the first end and the closing wheel arm is coupled to the second end via a pivot joint. The at least one row unit closing wheel assembly includes an adjustable wedge assembly including a wedge coupled to the pivot joint. The adjustable wedge assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint. The adjustable wedge assembly is configured to adjust the angle between multiple set angle points relative to an initial set angle point.

In another embodiment, a system for changing an angle for a closing wheel includes an adjustable wedge assembly comprising a wedge configured to couple to a pivot joint between a closing wheel shaft and a closing wheel arm of a closing wheel assembly having the closing wheel. The adjustable wedge assembly is configured to adjust the angle of the closing wheel shaft relative to the closing wheel arm along a horizontal plane via movement of the closing wheel shaft about a pivot joint coupling the closing wheel shaft to the closing wheel arm, the horizontal plane being orthogonal to a rotational axis of the pivot joint, wherein the adjustable wedge assembly is configured to adjust the angle between multiple set angle points relative an initial set angle point. The angle at the initial set angle point is a substantially orthogonal angle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
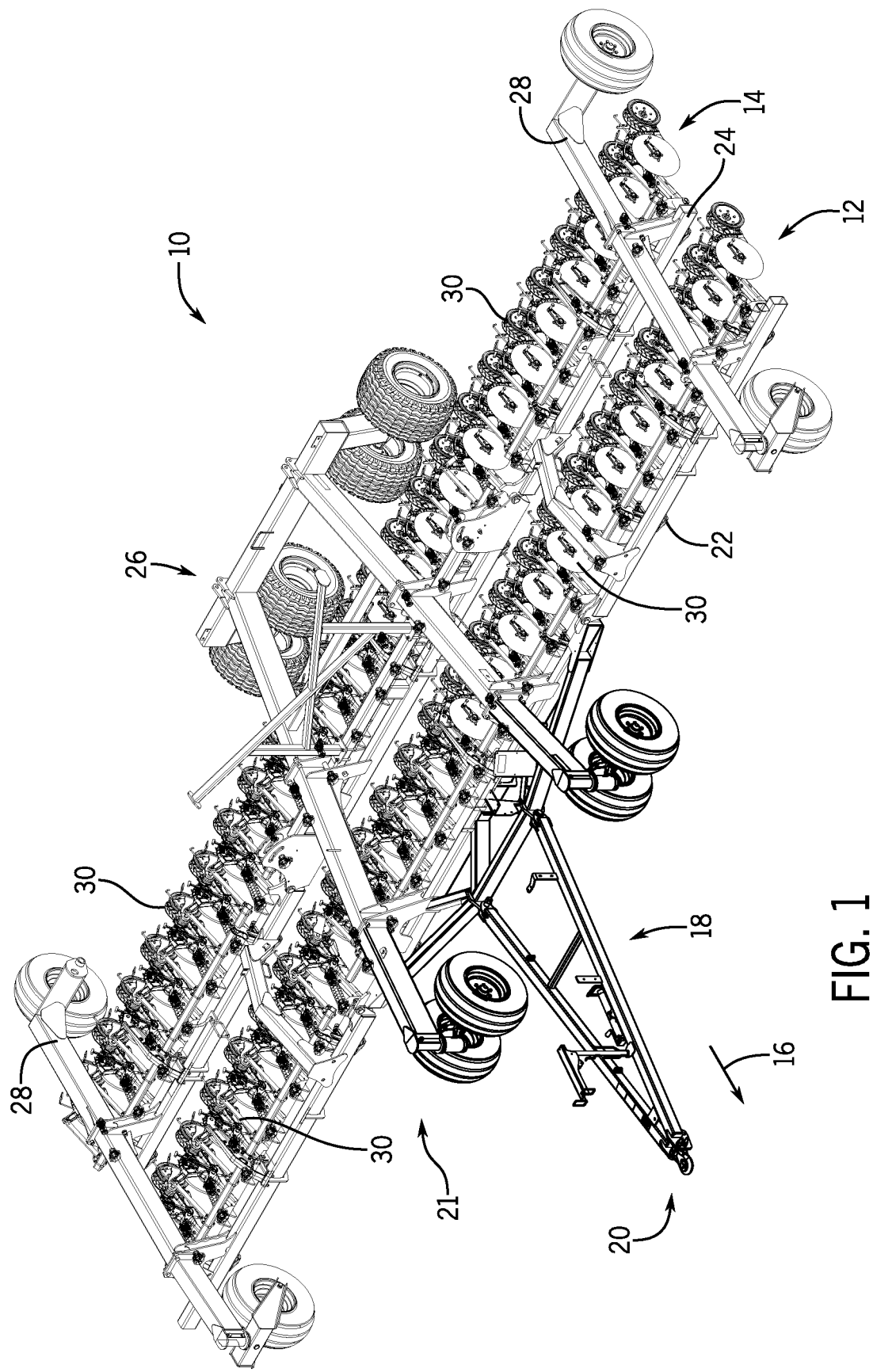
FIG. 1 is a perspective view of a disk drill with two rows of staggered row units, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed to agricultural implements, such as disk drills, capable of deposited agricultural product into a field. Disk drills may form several parallel trenches in the surface of a field as the disk drill is towed in a direction of travel, deposits agricultural product(s) within each trench, and packs displaced soil over the deposited agricultural product. The disk drill may include several row units, and each may form a respective trench as a disk of the respective row unit displaces soil. Each row unit may also include components (e.g. a product chute) that enable placement of an agricultural product, such as seed or fertilizer, in the respective trench. Each row unit may also include an independent packer wheel (e.g., closing wheel) that packs the displaced soil onto the deposited agricultural product to cover the respective trench formed by the disk. During operation of the disk drill, certain soil conditions (e.g., wetter soils, soils with high clay or silt content, soils with heavy field residue, etc.) keep the closing system from collapsing a sidewall of a seed trench, which negatively impacts seed germination, and ultimately yield.

As will be explained below, the embodiments below describe an adjustable wedge assembly for adjusting an angle of a closing wheel to enable the closing wheel to properly close an open seed trench even under more challenging soil conditions. In some embodiments, a row unit closing wheel assembly includes a closing wheel, a closing wheel arm, and a closing wheel shaft having a first end and a second end. The closing wheel is coupled to the first end and the closing wheel arm is coupled to the second end via a pivot joint. An adjustable wedge assembly is coupled to the pivot joint. The adjustable wedge assembly is configured to adjust an angle of the closing wheel shaft relative to the closing wheel arm along a horizontal plane via movement of the closing wheel shaft about the pivot joint. The horizontal plane is orthogonal to a rotational axis of the pivot joint.

Referring now to the drawings, FIG. 1 is a perspective view of a disk drill 10 with two rows 12, 14 of row units. The disk drill 10 may be towed by a tractor in a direction of travel 16. In the illustrated embodiment, the disk drill 10 includes an A-frame 18 and a hitch assembly 20, which may be coupled to a corresponding hitch assembly of the tractor. The A-frame 18 is coupled to a main frame 21 of the disk drill 10. In addition, the main frame 21 includes a first frame element 22 that supports a first row 12 of row units and a second frame element 24 that supports a second row 14 of row units. The frame elements 22 and 24 are connected to each other and supported by a central frame section 26 and side frame sections 28 of the main frame 21. Wheels are coupled to the central frame section 26 and the side frame sections 28 to facilitate movement of the disk drill 10 through the field. It should be understood that, while the disk drill 10 includes forty-eight row units 30 (e.g., closing wheel assemblies), arrangements with any number of row units 30 may be employed. As described in greater detail below, each row unit 30 (e.g., closing wheel assembly) may include an adjustable wedge assembly for adjusting an angle of a closing wheel.

Figure 2:
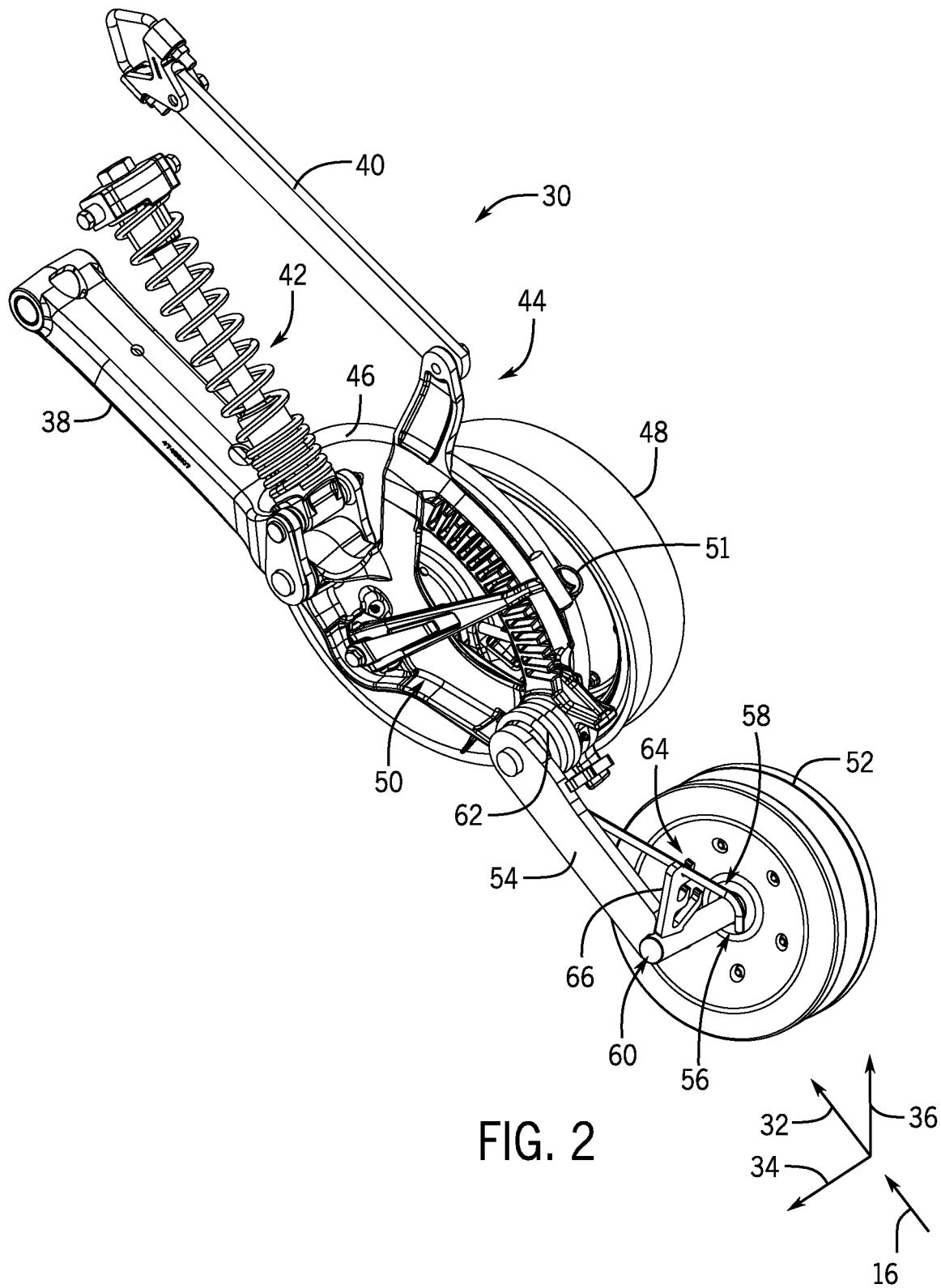
FIG. 2 is a perspective view of a disk drill row unit which may be used in the disk drill of FIG. 1, in accordance with an embodiment of the present disclosure.
Figure 3:
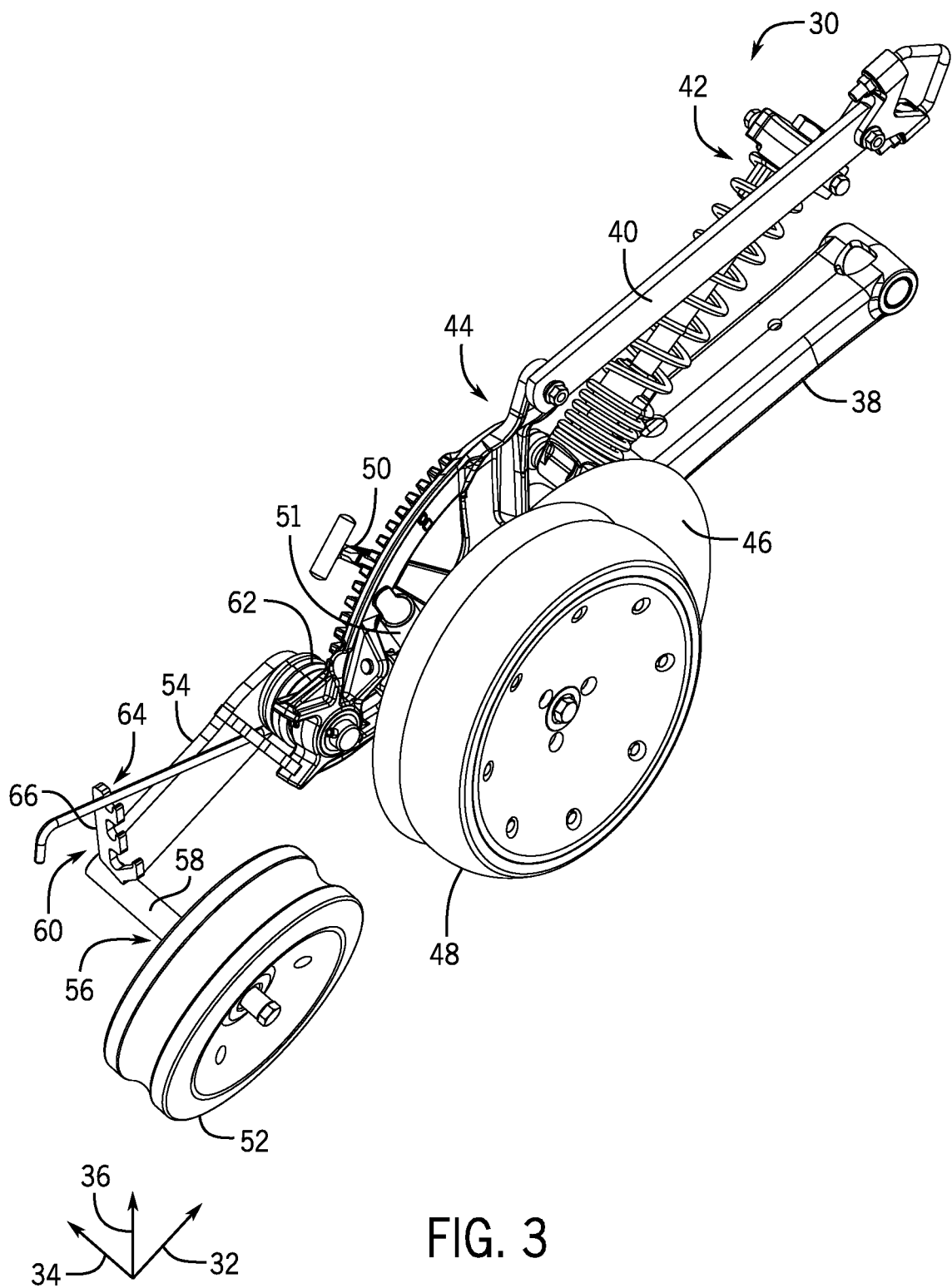
FIG. 3 is a perspective view of a disk drill row unit of FIG. 2, in accordance with an embodiment of the present disclosure.
Figure 4:
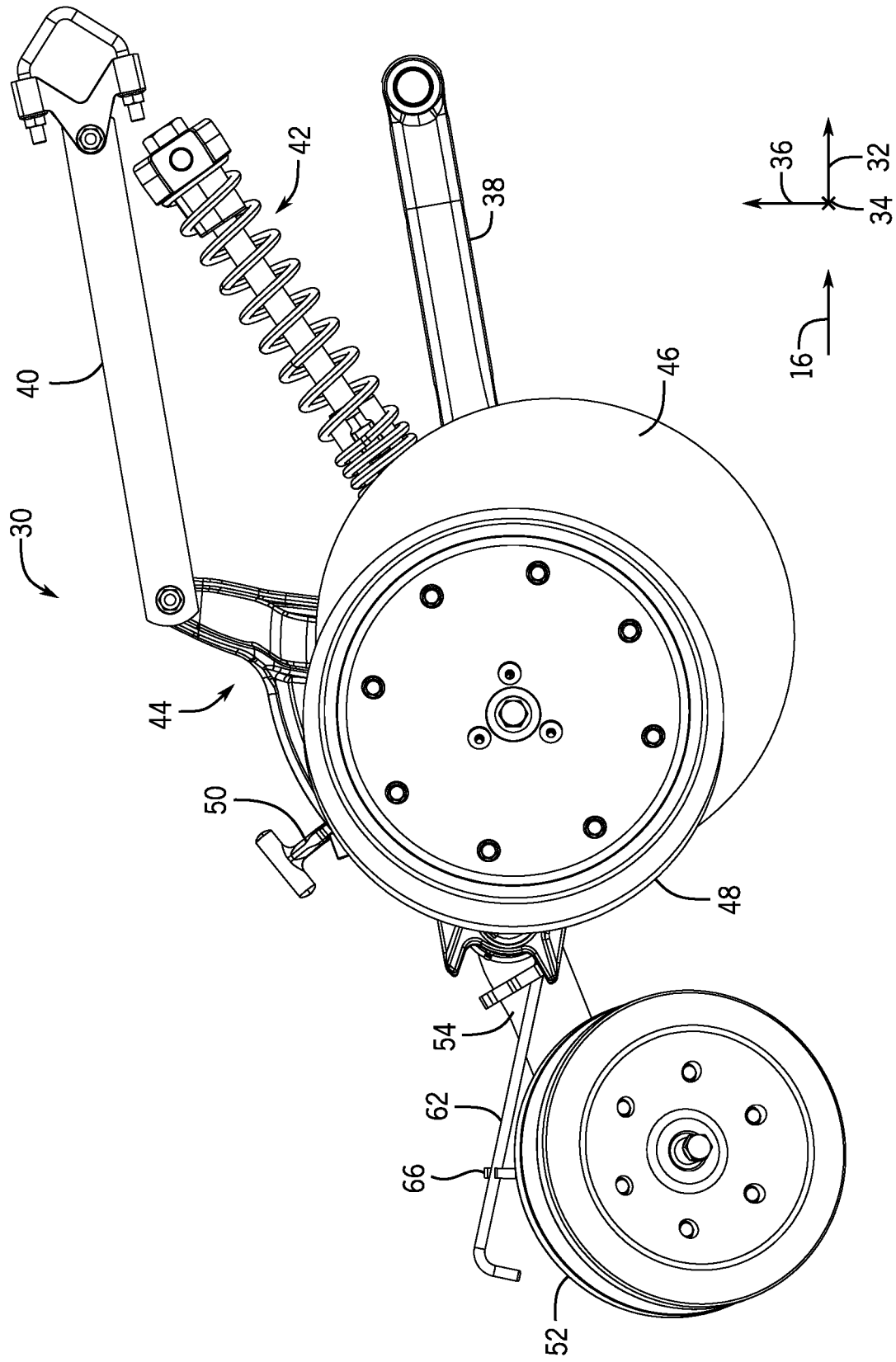
FIG. 4 is a side view of the disk drill row unit of FIG. 2, in accordance with an embodiment of the present disclosure.
Figure 5:
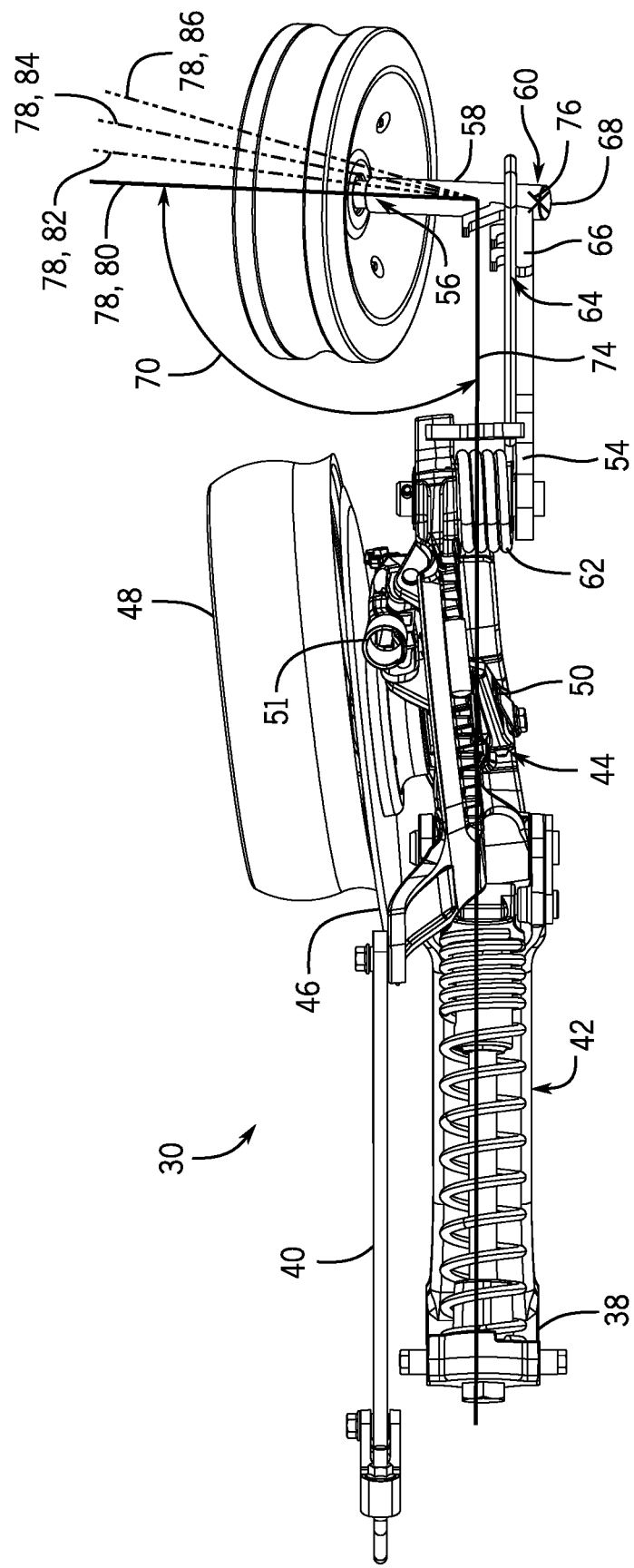
FIG. 5 is a top view of the disk drill row unit of FIG. 2, in accordance with an embodiment of the present disclosure.

FIGS. 2-5 are views of a row unit 30 that may be used in the disk drill of FIG. 1 (without the adjustable wedge assembly shown). More specifically, FIGS. 2 and 3 are perspective views of the row unit 30, FIG. 4 is a side view of the row unit 30, and FIG. 5 is a top view of the row unit 30. The row unit 30 may be described with reference to a longitudinal axis or direction, 32, a lateral axis or direction 34, and a vertical axis or direction 36.

The row unit 30 includes links 38 and 40 and a damping assembly 42 (e.g., including a spring and a damper) that are configured to couple a frame 44 of the row unit 30 to the disk drill frame 21. The damping assembly 42 may be configured to force the frame 44 against the soil surface. Damping assembly 42 may also be configured to damp upward movement of the frame 44 as the row unit 30 encounters uneven ground. A disk 46 is rotatably coupled to the frame 44. The disk 46 is configured to form a trench in the soil. The depth of the trench may be controlled by the position of the disk 46 relative to a gauge wheel 48 along the vertical axis 36. The vertical position of the gauge wheel 48 may be controlled by a depth regulator handle 50, which in turn changes the depth that the disk 46 cuts the trench in the soil. An agricultural product (e.g., seed or fertilizer) may be disposed within the trench formed by disk 46 via a product chute or conduit 51.

Closing wheel 52 couples to the frame 44 with linkage 54 (e.g., closing wheel arm). Specifically, the closing wheel 52 is coupled to a first end 56 of a closing wheel shaft or spindle 58 and a second end 60 of the closing wheel shaft 58 is coupled to closing wheel arm 54. The closing wheel 52 may be substantially laterally aligned with disk 46 to cover a trench formed by disk 46 as the row unit 30 moves in direction of travel 16. The frame 44 also supports a spring 62 that urges the closing wheel 52 toward the soil surface. The torque applied by the spring 62 may be adjusted by placing an end of the spring 62 in one of a set of slots 64 in an adjustment plate or bar 66. The pressure of closing wheel 52 may therefore be adjusted depending on the soil type, the agricultural product dispensed, etc.

As shown in FIG. 5, the closing wheel shaft 58 is coupled to the closing wheel arm 54 via a pivot joint 68 that enables the closing wheel shaft 58 to be rotated relative to the closing wheel arm 54 (e.g., in a circumferential direction 69)

to adjust an angle 70 of the closing wheel shaft 58 (and, thus, the angle 68 of the closing wheel 52) relative to the closing wheel arm 54 relative to a horizontal plane (indicated by line 74 extending in directions 32 and 34). A rotational axis 76 (extending into and out of the page) of the pivot joint 68 is orthogonal to the horizontal plane 74. In certain embodiments, the pivot joint 68 may be formed be a rod, shaft, pin, or bolt connection thru the adjacent ends of the closing wheel shaft 58 and the closing wheel arm 54. As described in greater detail below, an adjustable wedge assembly may be coupled to the pivot joint 68 and both the closing wheel shaft 58 (e.g., directly) and the closing wheel arm 54 (e.g., indirectly) and be configured to adjust the angle 70. Adjustments to change the adjustable wedge assembly to change the angle 70 may occur in a tool-less manner.

The adjustable wedge assembly may adjust the closing wheel shaft 58 relative to the closing wheel arm 54 (and, thus, the angle 70) between a number of fixed positions 78 associated with set angle points. The positions 78 may include an initial position 80 associated with an initial set angle point. The angle 70 for the initial set angle point at the initial position 80 is a substantially orthogonal angle (e.g., approximately 90 degrees±0.5 degrees). For example, the angle 70 for the initial set angle point may be approximately 90.5 degrees. The initial set angle point may be referenced as 0 degrees. Other fixed positions 78 (e.g., positions 82, 84, 86) are represented by dashed lines 82, 84, 86. The set angle points for positions 82, 84, 86 may have a difference of approximately 5 degrees, 7.5 degrees, and 10 degrees, respectively, relative to the initial set angle point. For example, in certain embodiments, the set angle points may have an angle of approximately 95.5 degrees, 98 degrees, and 100.5 degrees. The number of positions 78 and set angle points may vary (e.g., 2, 3, 4, 5 or more positions). In certain embodiments, the number of positions 78 may be finite. The value for the angle 70 of the set angle points relative to the initial set angle point may also vary. In certain embodiments, the difference in angle change between the set angle points may vary. In other embodiments, the difference in angle change between the set angle points may be constant. The value of the angle 70 for each set angle point (other than the initial set angle point) is greater than the value of the angle 70 for the initial set angle point.

Figure 6:
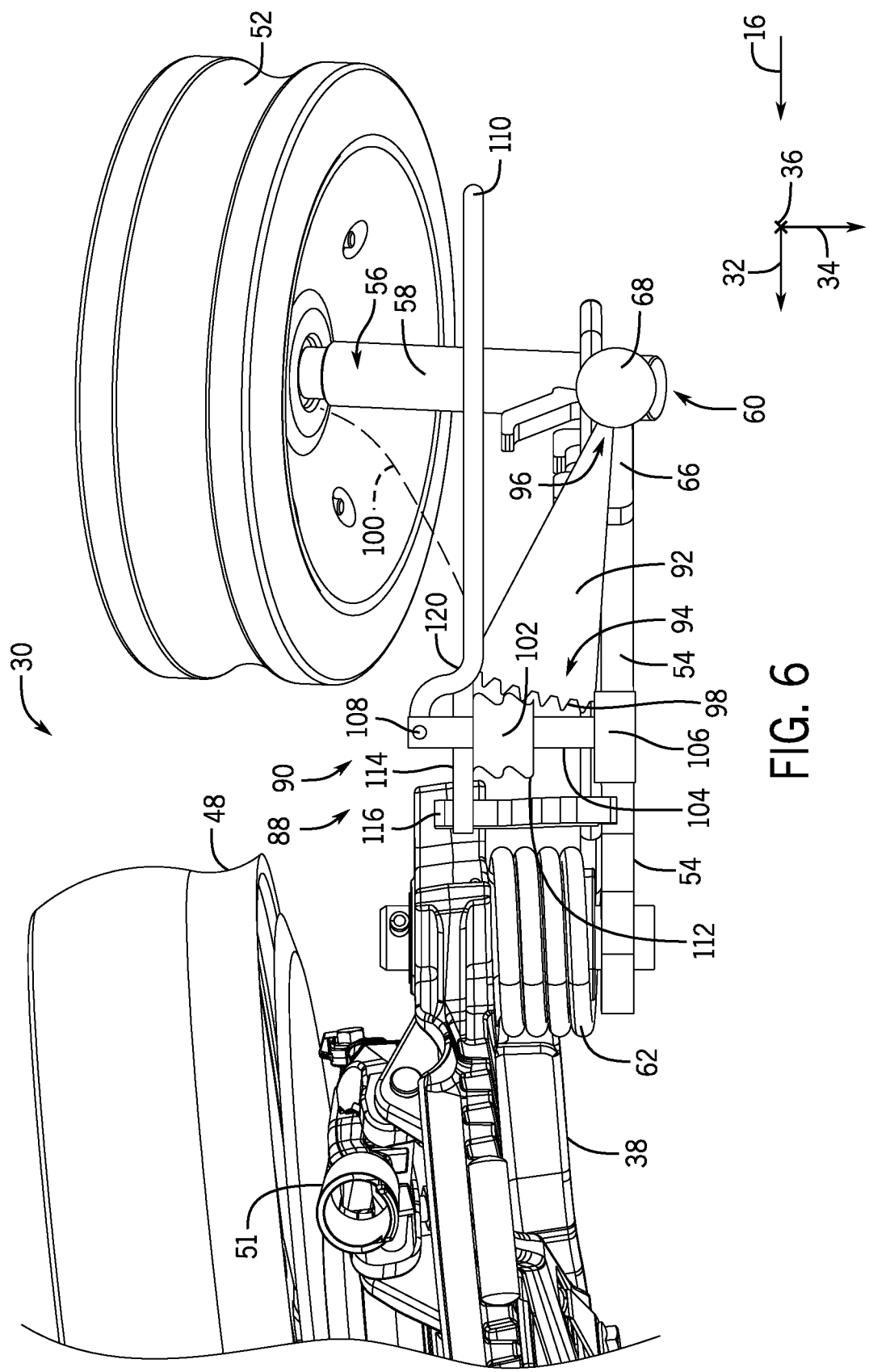
FIG. 6 is a top view of a portion of a disk drill row unit with an adjustable wedge assembly (e.g., having a worm gear assembly), in accordance with an embodiment of the disclosure.
Figure 7:
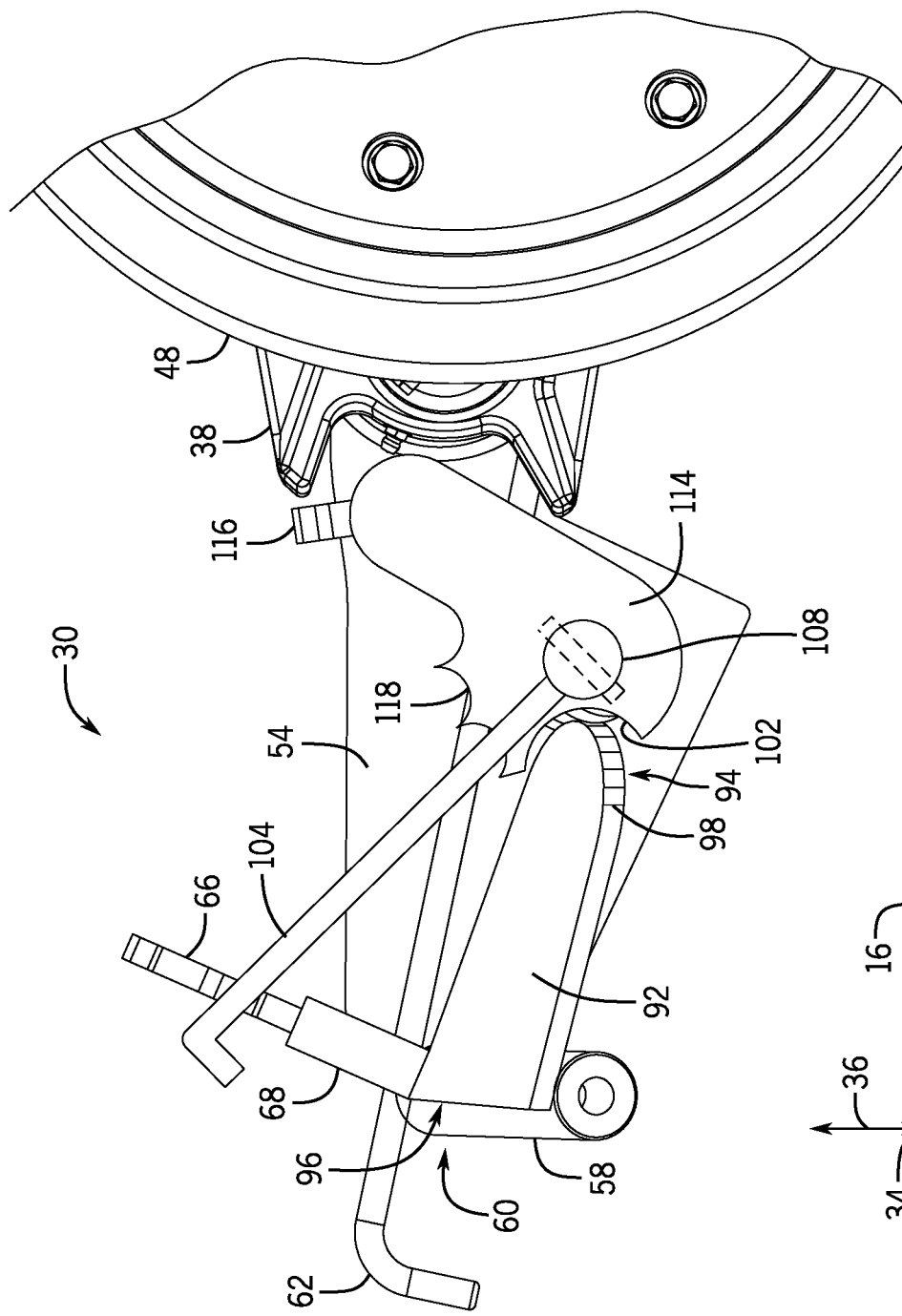
FIG. 7 is a side view of a portion of the disk drill row unit in FIG. 6, in accordance with an embodiment of the present disclosure.

FIGS. 6-16 illustrate different embodiments of an adjustable wedge assembly that may be utilized on the row unit 30 for adjusting an angle of the closing wheel 52. FIGS. 6 and 7 are views of a portion of the disk drill row unit 30 with an adjustable wedge assembly 88 (e.g., worm gear assembly 90). Some components (e.g., closing wheel 52) of the disk drill row unit 30 are not shown in FIG. 7 to facilitate viewing of the adjustable wedge assembly 88. The adjustable wedge assembly 88 includes a wedge 92 (e.g., plate) having a first end 94 and a second end 96. The first end 94 includes a number of gear teeth 98 (e.g., approximately 20 degrees or less of driven gear teeth). For example, the wedge 92 may include approximately 10 degrees of driven gear teeth 98. The gear teeth 98 enable the rotation of the wedge 92 (and, thus, the closing wheel shaft 58 relative to the closing wheel arm 54) about the pivot joint 68 over a limited angular range (e.g., between approximately 0 and 20 degrees). The rotation of the wedge 92 enables a change in the rotational position of the wedge 92 and a change in the set angle point between the closing wheel shaft 58 and the closing wheel arm 54.

The second end 96 is coupled to the pivot joint 68. As depicted in FIG. 6, only a portion of the wedge 92 is shown to illustrate the components below the wedge 92. The wedge 92 extends to and is coupled to the closing wheel shaft 58 (as indicated by the dashed line 100) to enable rotation of the closing wheel shaft 58 relative to the closing wheel arm 54 when the wedge 92 rotates about the pivot joint 68.

The wedge assembly 88 (e.g., worm gear assembly 90) also includes a worm 102 disposed on a shaft 104. The shaft 104 is coupled to the closing wheel arm 54 via a headed pin 106. The other end of the shaft 104 is coupled to a roll pin 108 coupled to a lever 110 (e.g., for single hand adjustment). The worm 102 includes threads 112 that interface with the gear teeth 98 on the wedge 92 to form a worm gear. Actuation of the lever 110 is configured to cause rotation of both the worm 102 and the wedge 92 (over the limited angular range) to change the angle between the closing wheel shaft 58 and the closing wheel arm 54. For example, movement of the lever 110 in direction 36 out of the page (with reference to FIG. 6) would increase the angle between the closing wheel shaft 58 and the closing wheel arm 54, while movement of the lever 110 in direction 36 into the page would decrease the angle (but no smaller than the angle at the initial set angle point) between the closing wheel shaft 58 and the closing wheel arm 54. The roll pin 108 is coupled to a support 114. The support 114 is coupled to a plate or bar 116 extending orthogonally (e.g., in direction 34) from the closing arm 54. In certain embodiments, the support 114 may be coupled to the link 38 or another portion of the row unit 30. The support 114 includes detents 118 that interact with portion 120 of the lever 110 to maintain a position of the lever 110. Each of the detents 118 is associated with different positions for the lever 110 and, thus, set angle points between the closing wheel shaft 58 and the closing wheel arm 54.

Figure 8:
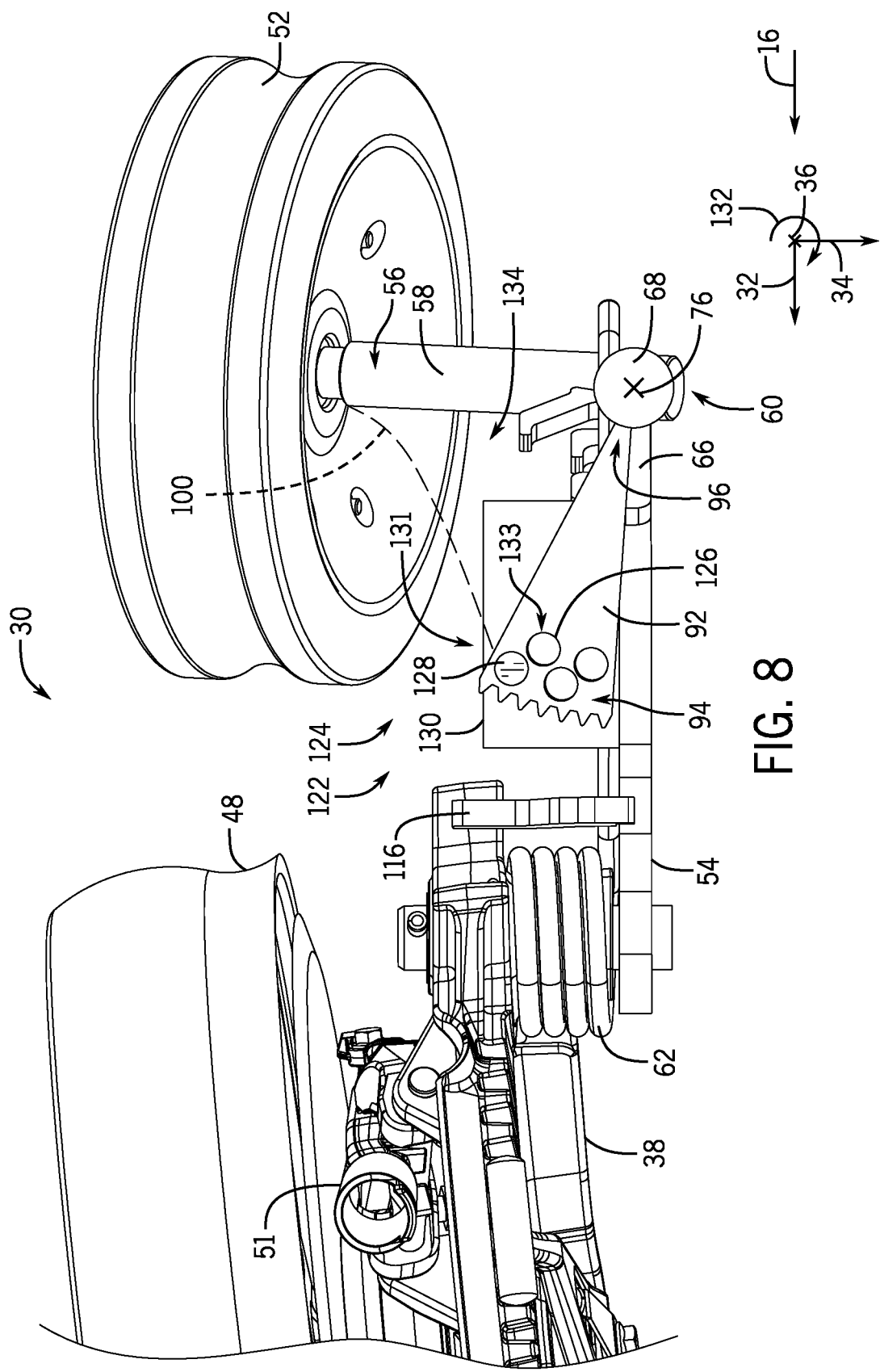
FIG. 8 is a top view of a portion of a disk drill row unit with an adjustable wedge assembly (e.g., having a pinned array assembly), in accordance with an embodiment of the disclosure.

FIG. 8 is a top view of a portion of the disk drill row unit 30 with an adjustable wedge assembly 122 (e.g., pinned array assembly 124). The adjustable wedge assembly 122 includes a wedge 92 (e.g., plate) having a first end 94 and a second end 96. The first end 94 includes a number of holes 126. The adjustable wedge assembly 122 also includes a removable fastener (e.g., pin 128). The pin 128 is configured to be set within one of the holes 126 and to a set a rotational position of the wedge 92. A stationary plate 130 is coupled to the closing wheel arm 54 below the wedge 92 in direction 36. The pin 128 when disposed within one of the holes 126 extends into a hole or receptacle within the stationary plate 130. For example, a first set 131 of holes 126 may be circumferentially 132 aligned relative to the 76 rotational axis of the pivot joint 68, while a second set 133 of holes 126 may be circumferentially 132 aligned relative to the rotational axis 76 at a more inner radial position relative to the rotational axis 76. Each set of holes 126 may be associated with and circumferentially 132 aligned with a different hole or receptacle in the stationary plate 130 for placing the pin 128 within. For example, the first set 131 of holes 126 may be associated with a single hole in the plate 130 and the second set 133 of holes may be associated with a single different hole in the plate 130 located at a different radial position (e.g., more inner radial position) relative to the rotational axis 76. Each hole 126 represents a different set angle point for the angle between the closing wheel shaft 58 and the closing wheel arm 54 (and different rotational positions for the wedge 92). As depicted, the wedge 92 includes four holes 126 and, thus, four different set angle points. The number of holes 126 may vary (e.g., 2, 3, 4, 5, etc.). The position of the holes 126 may vary. The number and position of the holes 126 in the wedge 92 enable the rotation of the wedge 92 (and, thus, the closing wheel shaft 58 relative to the closing wheel arm 54) about the pivot joint 68 over a limited angular range (e.g., between approximately 0 and 20 degrees). For example, the holes 126 may enable approximately 10 degrees of rotation. The rotation of the wedge 92 enables a change in the rotational position of the wedge 92 and a change in the set angle point between the closing wheel shaft 58 and the closing wheel arm 54.

The second end 96 of the wedge 92 is coupled to the pivot joint 68. As depicted in FIG. 8, only a portion of the wedge 92 is shown to illustrate the components below the wedge 92. The wedge 92 extends to and is coupled to the closing wheel shaft 58 (as indicated by the dashed line 100) to enable rotation of the closing wheel shaft 58 relative to the closing wheel arm 54 when the wedge 92 rotates about the pivot joint 68. In certain embodiments, the plate 130 may extend to a location 134 closer to the closing wheel shaft 54. The holes or receptacles within the plate 130 may be located in the location 134 enabling the holes 126 within the wedge 92 to be located closer to the closing wheel shaft 58.

Figure 9:
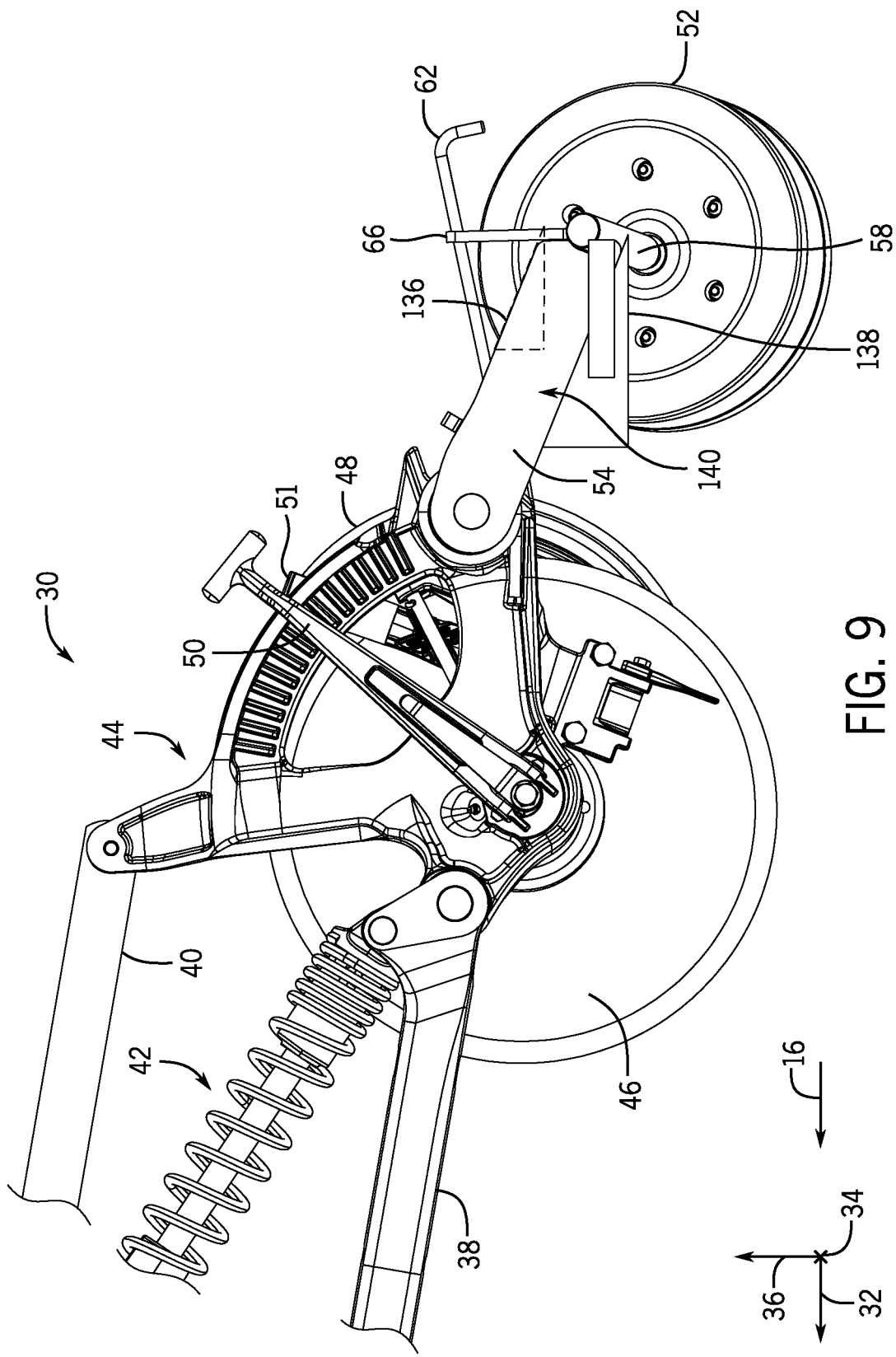
FIG. 9 is a side view of a portion of the disk drill row unit in FIG. 8, in accordance with an embodiment of the present disclosure.

In certain embodiments, the closing wheel arm 54 may need to be altered to accommodate the pinned array assembly 124. For example, as depicted in FIG. 9, an upper portion 136 (e.g., adjacent the adjustment plate 66 and outlined in dashed lines) of the closing wheel arm 54 may need to be removed to accommodate the pinned array assembly 124. In addition, as depicted in FIG. 9, additional material 138 (e.g., in the form of a plate of metal such as steel) may be added to a bottom portion 140 of the closing wheel arm 54. A slot or opening 142 may be formed in the closing wheel arm 54 (including the additional material 138) for the wedge 92 (e.g., plate or pivot plate) to pass through.

Figure 14:
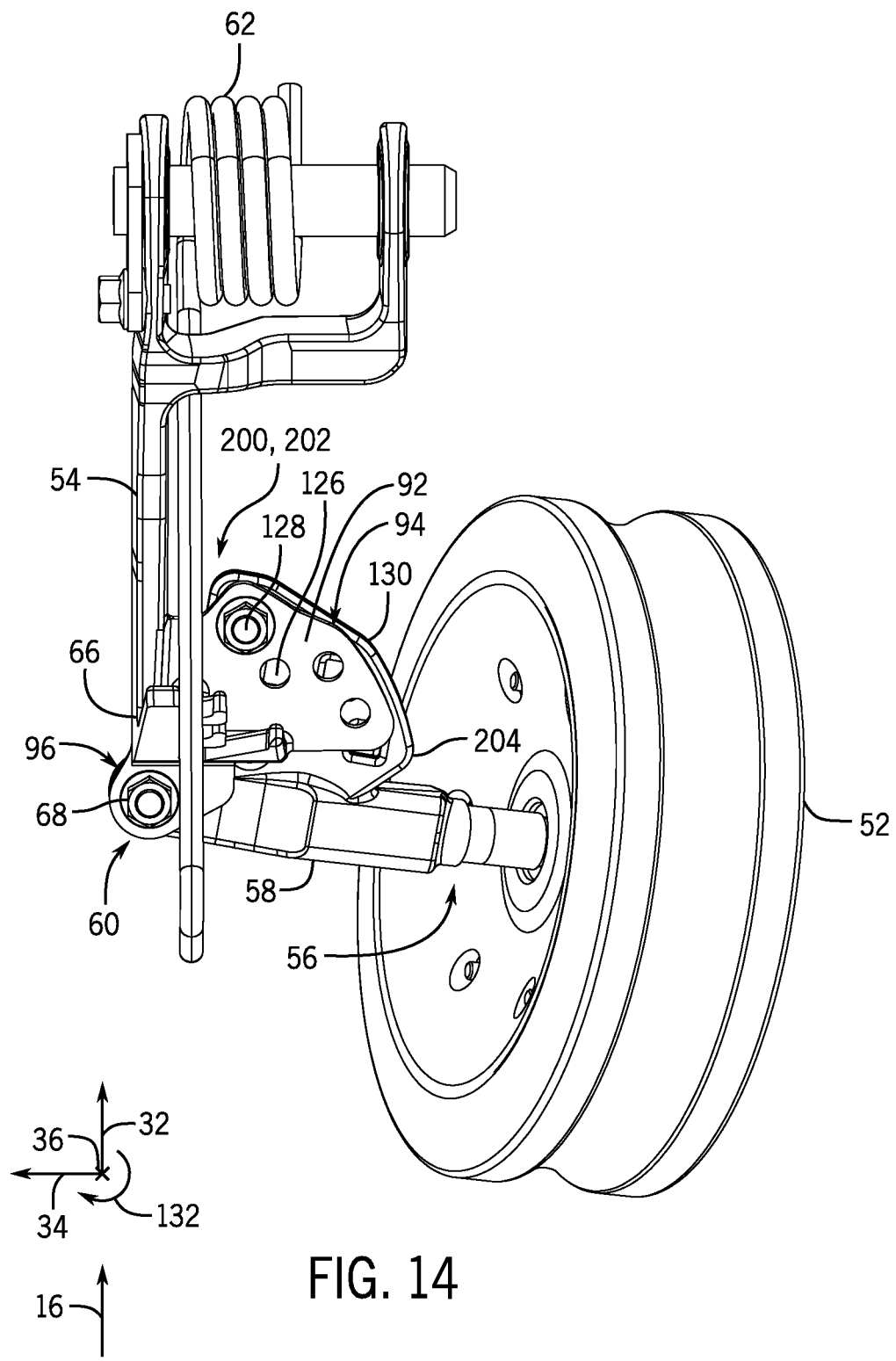
FIG. 14 is a top view of a portion of a disk drill row unit with an adjustable wedge assembly (e.g., cast pinned array assembly), in accordance with an embodiment of the disclosure.
Figure 15:
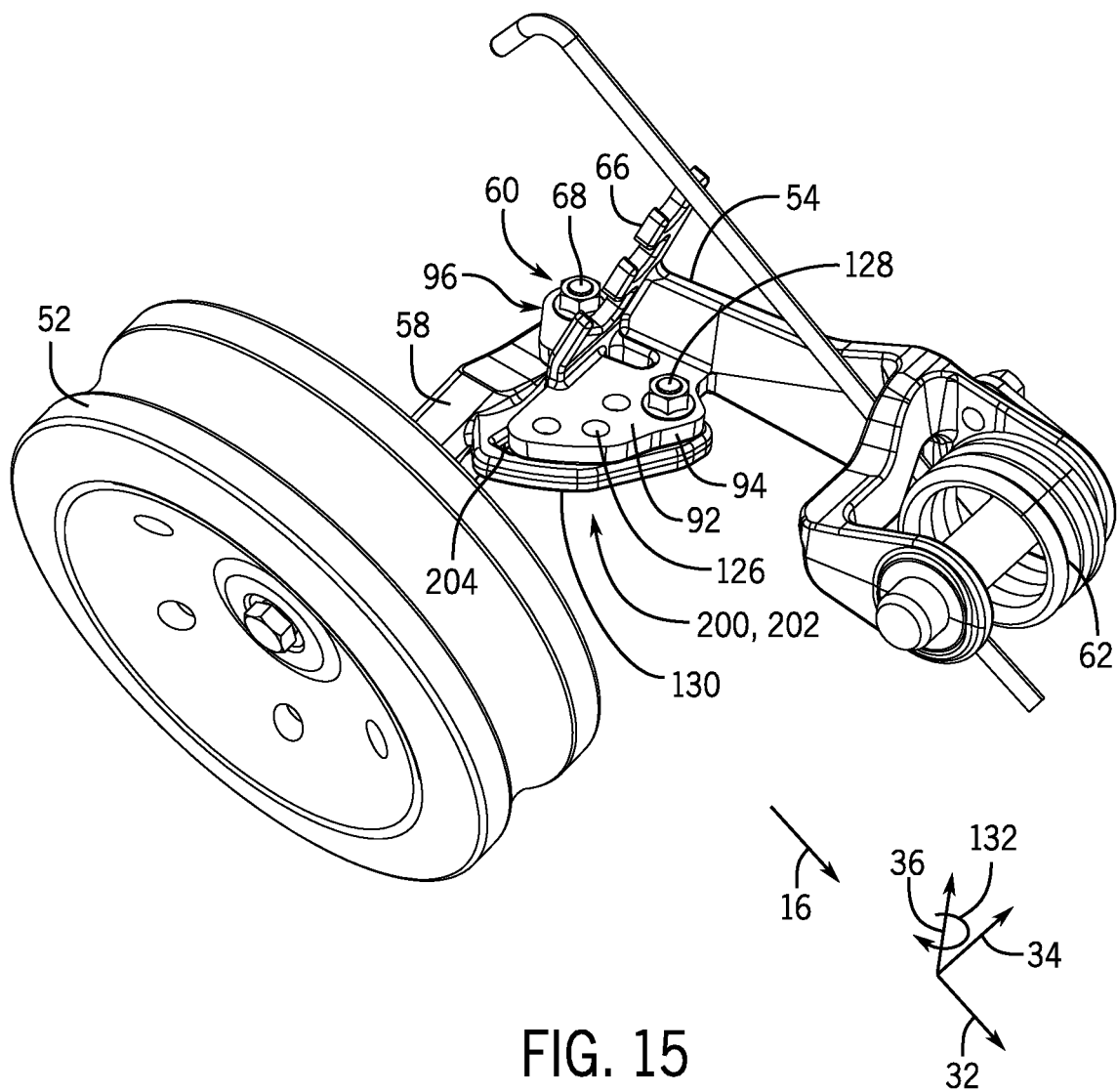
FIG. 15 is top perspective view of the portion of the disk drill row unit in FIG. 14, in accordance with an embodiment of the disclosure.
Figure 16:
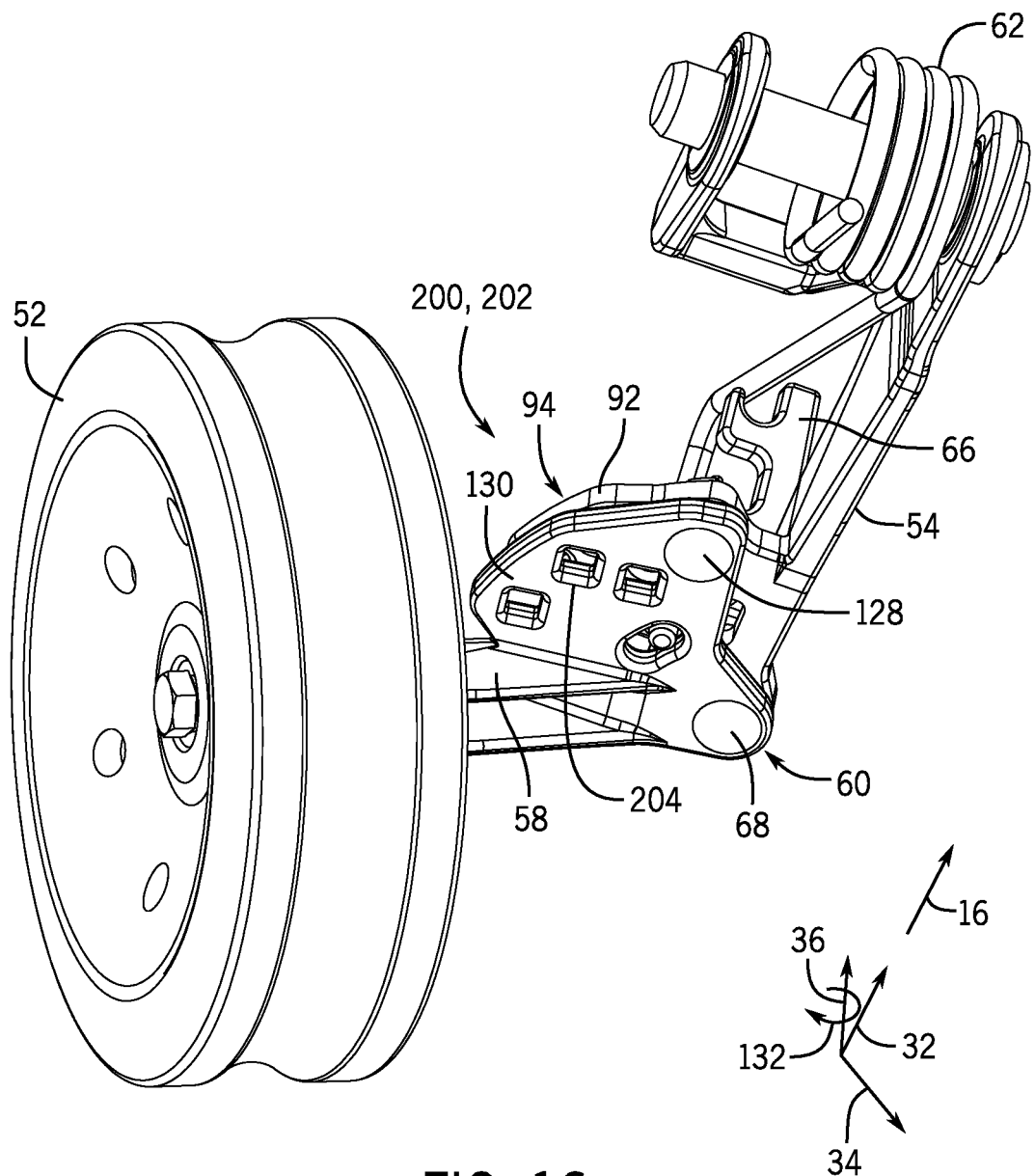
FIG. 16 is a bottom perspective view of the portion of the disk drill row unit in FIG. 14, in accordance with an embodiment of the disclosure.

FIGS. 14-16 are views of a portion of the disk drill row unit 30 with an adjustable wedge assembly 200 (e.g., cast pinned array assembly 202). FIG. 14 is a top view and FIGS. 15 and 16 are perspective views of the portion of the disk drill row unit 30. The adjustable wedge assembly 200 is similar to the adjustable wedge assembly 122 (e.g., pinned array assembly 124) described in FIGS. 8 and 9. However, as depicted, the stationary plate 130 is coupled to (e.g., cast as part of or integral to) the closing wheel shaft 56. The wedge 92 is coupled to (e.g., cast as part of or integral) to the closing wheel arm 54. The removable fastener 128 may be a bolt inserted within the desired hole 126 and the corresponding hole 204 on the stationary plate 160 for the desired set angle point and secured with a nut. As depicted, the closing wheel arm 54 is coupled to the closing wheel shaft 58 via a bolt secured by a nut to form the pivot joint 68. In certain embodiments, the stationary plate 130 may be integral to or coupled to the closing wheel shaft 58 and the wedge 92 may be integral or coupled to the closing wheel arm 54.

Figure 10:
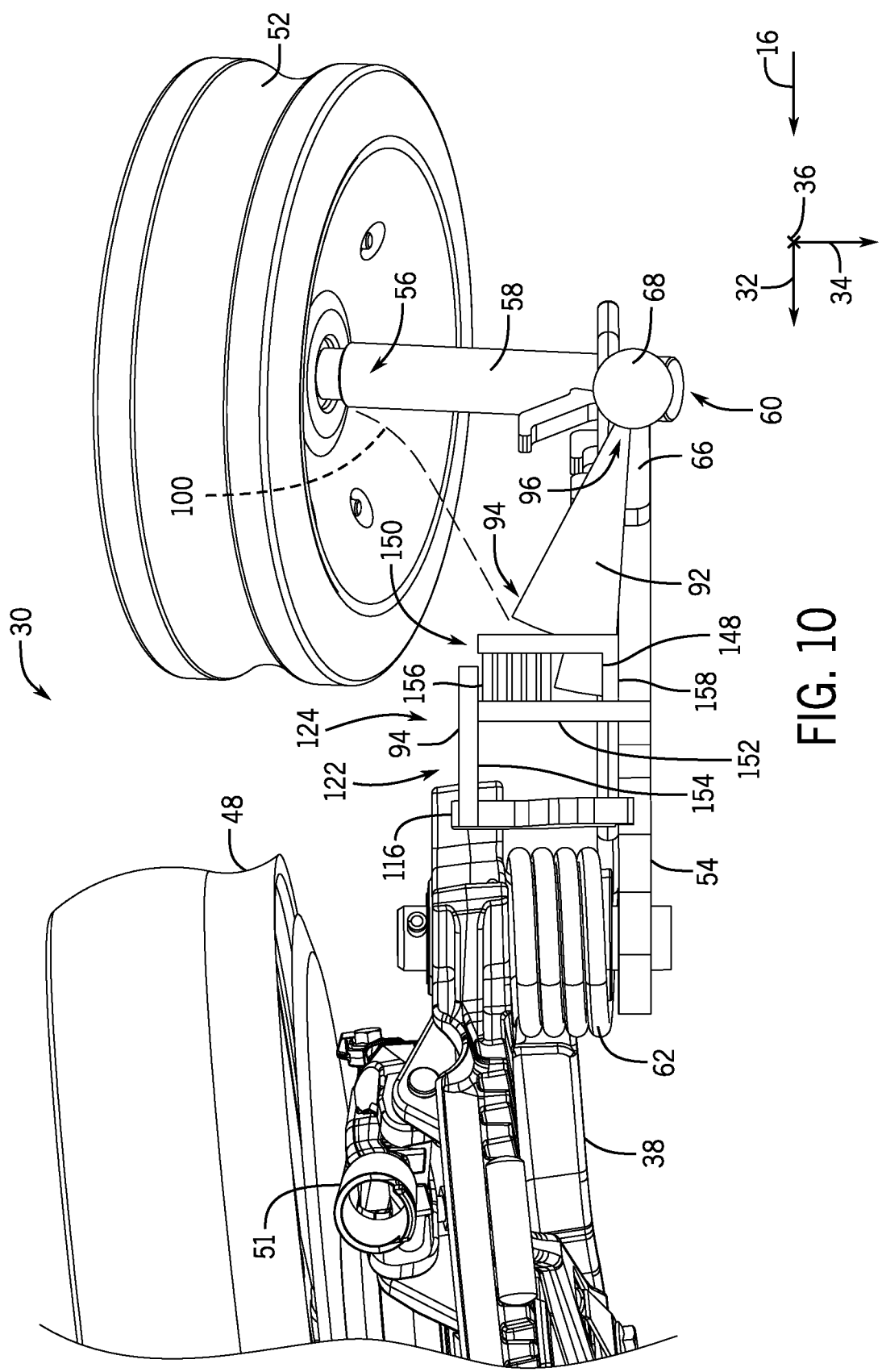
FIG. 10 is a top view of a portion of a disk drill row unit with an adjustable wedge assembly (e.g., shim/wedge assembly), in accordance with an embodiment of the disclosure.

FIG. 10 is a top view of a portion of the disk drill row unit 30 with an adjustable wedge assembly 144 (e.g., shim/wedge assembly 146). The adjustable wedge assembly 122 includes a wedge 92 (e.g., plate) having a first end 94 and a second end 96. The first end 94 has a protrusion 148 extending (e.g., in direction 32) beyond the rest of the end 94. The adjustable wedge assembly 122 also includes a shim assembly 150. The shim assembly includes a bolt or shaft 152 coupled on one end to a support 154 and on the opposite end to the closing wheel arm 54. The support 154 is coupled to the plate or bar 116 extending orthogonally (e.g., in direction 34) from the closing arm 54. In certain embodiments, the support 154 may be coupled to the link 38 or another portion of the row unit 30. The support 154 extends parallel to the closing wheel arm 54.

Figure 11:
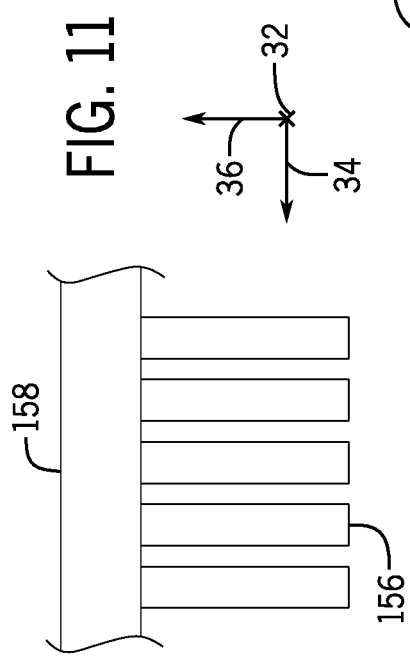
FIG. 11 is a side view of a portion of a shim assembly of the adjustable wedge assembly in FIG. 10, in accordance with an embodiment of the disclosure.
Figure 12:
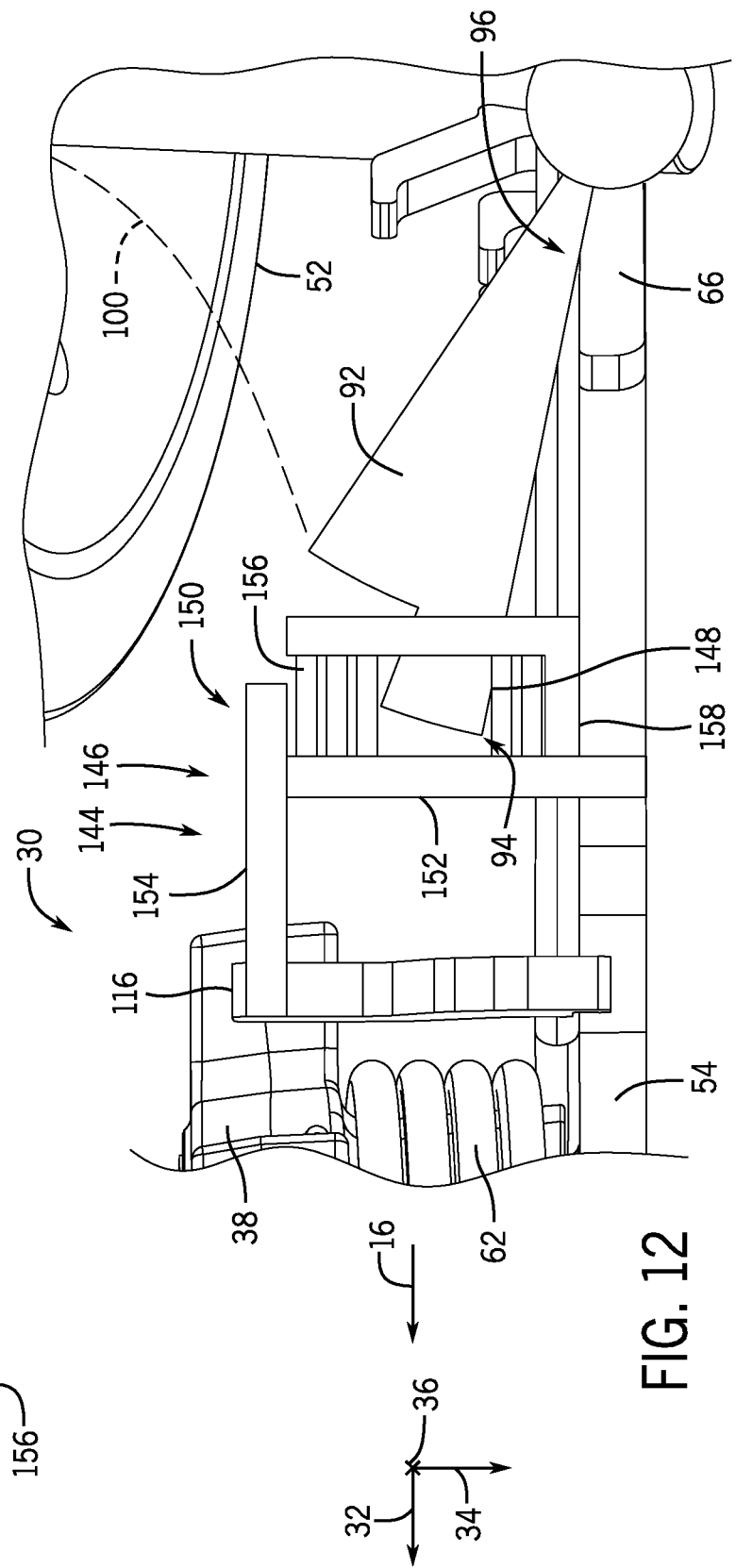
FIG. 12 is a top view of the portion of the disk drill row unit in FIG. 10 (e.g., having a wedge in a different rotational position), in accordance with an embodiment of the disclosure.

A plurality of shims 156 are coupled to the bolt 152. The number of shims 156 may vary based on a number of desired set angle points. As depicted, there are five shims 156. A shim 158 is coupled to the bolt 152. As depicted, the shim 158 has an L-shape. In certain embodiments, the shape of the shim 158 may be different. The shim 158 keeps the shims 156 from losing position when disposed on them. The shims 156 extend vertically below the shim 158 in the direction 36 (e.g., as shown in FIG. 11). Rotation of the bolt 152 about its axis (e.g., in direction 36) causes the shim 158 to raise or lower (via rotation about the bolt 152). When shim 158 is lifted or raised, the position of the shims 156 may be adjusted (e.g., being slid in direction 34 along the bolt 152). When the shim 158 is lowered, the shims 156 remain in position. The protrusion 148 of the wedge 92 may inserted between one or more shims 156 (e.g., between two adjacent shims 156, between one shim 156 and a portion of the shim 158 extending parallel to the closing wheel arm 54), or one shim and the support 156) to set a rotational position of the wedge 92. Which shims 156 the protrusion 148 is inserted within determines the rotational position of the wedge 92 and set angle point. Each possible insertion point between the shims 156 (and/or the shim 158 and the support 154) is associated with a different rotational position of the wedge 92 and a different set angle point for the angle between the closing wheel shaft 58 and the closing wheel arm 54. FIG. 10 depicts the wedge 92 in a first rotational position with the protrusion 148 inserted between a portion of the shim 158 extending parallel to the closing wheel arm 54 and the shim 156 most adjacent this portion of the shim 158. FIG. 12 depicts the wedge 92 in a second different rotational position with the protrusion 148 inserted between a pair of adjacent shims 156.

Figure 13:
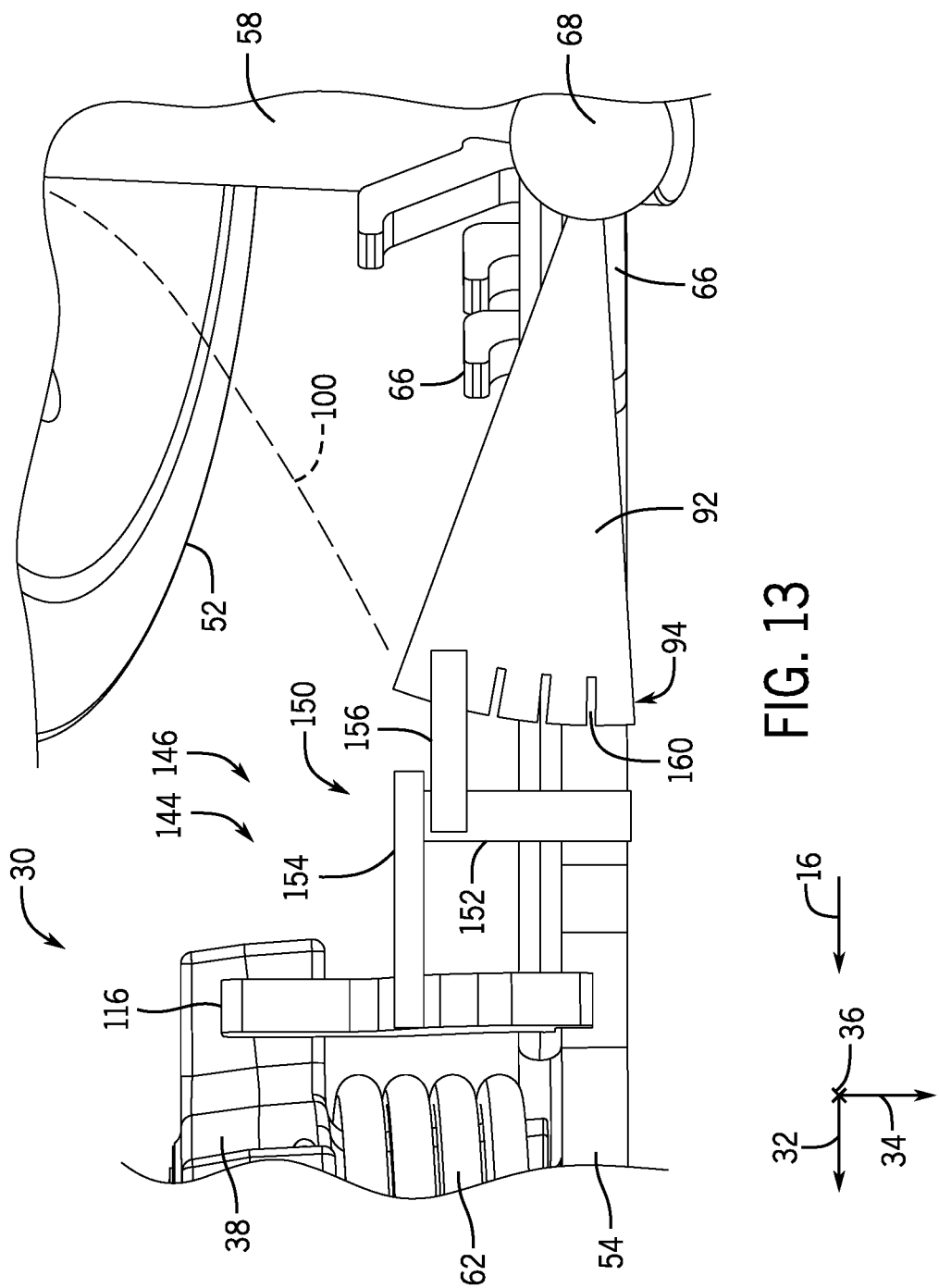
FIG. 13 is a top view of a portion of a disk drill row unit with an adjustable wedge assembly (e.g., shim/wedge assembly), in accordance with an embodiment of the disclosure

In certain embodiments, as depicted in FIG. 13, the structure of the shim assembly 150 and the wedge 92 for the adjustable wedge assembly 144 (e.g., the shim/wedge assembly 146), along with their interaction, may vary. Specifically, the shim assembly 150 includes a single shim 156. Also, the wedge 92 (instead of a protrusion) includes a plurality of slots 160 on the end 94. Rotation of the bolt 152 lifts or raises the single shim 156. When the shim 156 is in the raised position, the wedge 92 may be rotated to a desired rotational position and the shim 156 lowered to enable insertion of the shim 156 into the slot 160 that maintains the desired rotational position. Each slot 160 (when the shim 156 is inserted within it) is associated with a different rotational position for the wedge 92 and, thus, a different set angle point for the angle between the closing wheel shaft 58 and the closing wheel arm 54.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A row unit closing wheel assembly, comprising:
    a closing wheel;

a closing wheel arm;
a closing wheel shaft having a first end and a second end, wherein the closing wheel is coupled to the first end and the closing wheel arm is coupled to the second end via a pivot joint; and
an adjustable wedge assembly comprising a wedge coupled to the pivot joint, wherein the adjustable wedge assembly is configured to adjust an angle of the closing wheel shaft relative to the closing wheel arm along a horizontal plane via movement of the closing wheel shaft about the pivot joint, and wherein the horizontal plane is orthogonal to a rotational axis of the pivot joint.

2. The row unit closing wheel assembly of claim 1, wherein the adjustable wedge assembly is configured to adjust the angle between a plurality of set angle points relative to an initial set angle point.

3. The row unit closing wheel assembly of claim 2, wherein the angle at the initial set angle point is a substantially orthogonal angle.

4. The row unit closing wheel assembly of claim 3, wherein the angle for each set angle point of the plurality of set angle points other than the initial set angle point is greater than the angle for the initial set angle point.

5. The row unit closing wheel assembly of claim 1, wherein a portion of the wedge is coupled to the closing wheel shaft.

6. The row unit closing wheel assembly of claim 1, wherein the wedge has a first end and a second end, the first end being coupled to at least the pivot joint, the second end comprising gear teeth, and wherein the gear teeth are configured to enable the rotation of the wedge over a limited angular range about the pivot joint.

7. The row unit closing wheel assembly of claim 6, wherein the adjustable wedge assembly comprises a worm disposed on a shaft and a lever coupled to the shaft, wherein the worm and the gear teeth on the wedge form a worm gear, and the actuation of the lever is configured to cause rotation of both the worm and the wedge to change the angle.

8. The row unit closing wheel assembly of claim 1, wherein the adjustable wedge assembly comprises a stationary plate coupled to the closing wheel arm or the closing wheel shaft and the wedge has a first end and a second end, the first end being coupled to at least the pivot joint, the second end having a plurality of holes extending through the wedge in a direction parallel with the rotational axis of the pivot joint, wherein each hole of the plurality of holes is associated with a different set angle point for the angle, and the adjustable wedge assembly comprises a fastener that is configured to be inserted within one of the holes of the plurality of holes to maintain a set angle point.

9. The row unit closing wheel assembly of claim 8, wherein the plurality of holes is configured to enable the rotation of the wedge over a limited angular range about the pivot joint.

10. The row unit closing wheel assembly of claim 1, wherein the adjustable wedge assembly comprises at least one shim and the wedge has a first end and a second end, the first end being coupled to at least the pivot joint, the second end being configured to interact with the at least shim to determine a rotational position of the wedge from among a plurality of rotational positions, each rotational position of the plurality of rotational positions is associated with a different set angle point for the angle.

11. The row unit closing wheel assembly of claim 10, wherein the adjustable wedge assembly comprises a plurality of shims and the second end of the wedge comprises a protrusion that is configured to be inserted between one or more shims of the plurality of shims to set the rotational position of the wedge.

12. The row unit closing wheel assembly of claim 10, wherein the second end of the wedge comprises a plurality of slots configured to receive the at least one shim to set the rotational position the wedge.

13. An agricultural implement, comprising:
at least one row unit closing wheel assembly, comprising:
a closing wheel;
a closing wheel arm;
a closing wheel shaft having a first end and a second end, wherein the closing wheel is coupled to the first end and the closing wheel arm is coupled to the second end via a pivot joint; and
an adjustable wedge assembly comprising a wedge coupled to the pivot joint, wherein the adjustable wedge assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint, and wherein the adjustable wedge assembly is configured to adjust the angle between a plurality of set angle points relative to an initial set angle point.

14. The agricultural implement of claim 13, wherein the wedge comprises gear teeth located on an end of the wedge, wherein the gear teeth are configured to enable the rotation of the wedge over a limited angular range about the pivot joint, and wherein the adjustable wedge assembly comprises a worm disposed on a shaft and a lever coupled to the shaft, the worm and the gear teeth on the wedge form a worm gear, and the actuation of the lever is configured to cause rotation of both the worm and the wedge to change the angle.

15. The agricultural implement of claim 13, wherein the adjustable wedge assembly comprises a stationary plate coupled to the closing wheel arm or the closing wheel shaft and the wedge has a first end and a second end, the first end being coupled to at least the pivot joint, the second end having a plurality of holes extending through the wedge in a direction parallel with the rotational axis of the pivot joint, wherein each hole of the plurality of holes is associated with a different set angle point of the plurality of set angle points, and the adjustable wedge assembly comprises a fastener that is configured to be inserted within one of the holes of the plurality of holes to maintain a selected set angle point.

16. The agricultural implement of claim 13, wherein the adjustable wedge assembly comprises at least one shim and the wedge has a first end and a second end, the first end being coupled to at least the pivot joint, the second end being configured to interact with the at least shim to determine a rotational position of the wedge from among a plurality of rotational positions, each rotational position of the plurality of rotational positions is associated with a different set angle point of the plurality of set angle points.

17. A system for changing an angle for a closing wheel, comprising:
an adjustable wedge assembly comprising a wedge configured to couple to a pivot joint between a closing wheel shaft and a closing wheel arm of a closing wheel assembly having the closing wheel, wherein the adjustable wedge assembly is configured to adjust the angle of the closing wheel shaft relative to the closing wheel arm along a horizontal plane via movement of the closing wheel shaft about a pivot joint coupling the closing wheel shaft to the closing wheel arm, the horizontal plane being orthogonal to a rotational axis of the pivot joint, wherein the adjustable wedge assembly is configured to adjust the angle between a plurality of set angle points relative to an initial set angle point, and wherein the angle at the initial set angle point is a substantially orthogonal angle.

18. The system of claim 17, wherein the wedge comprises gear teeth located on an end of the wedge, wherein the gear teeth are configured to enable the rotation of the wedge over a limited angular range about the pivot joint, and wherein the adjustable wedge assembly comprises a worm disposed on a shaft and a lever coupled to the shaft, the worm and the gear teeth on the wedge form a worm gear, and the actuation of the lever is configured to cause rotation of both the worm and the wedge to change the angle.

19. The system of claim 17, wherein the adjustable wedge assembly comprises a stationary plate coupled to the closing wheel arm or the closing wheel shaft and the wedge has a first end and a second end, the first end being coupled to at least the pivot joint, the second end having a plurality of holes extending through the wedge in a direction parallel with the rotational axis of the pivot joint, wherein each hole of the plurality of holes is associated with a different set angle point of the plurality of set angle points, and the adjustable wedge assembly comprises a fastener that is configured to be inserted within one of the holes of the plurality of holes to maintain a selected set angle point.

20. The system of claim 19, wherein the plurality of holes is configured to enable the rotation of the wedge over a limited angular range about the pivot joint.

\* \* \* \* \*